April 7, 1970     I. ROSNER     3,504,618
AIR DUCT REGISTER WITH ANCHORING DEVICE Filed March 11, 1968     2 Sheets-Sheet 1

INVENTOR.
IRVING ROSNER

ATTORNEY

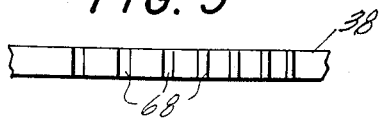
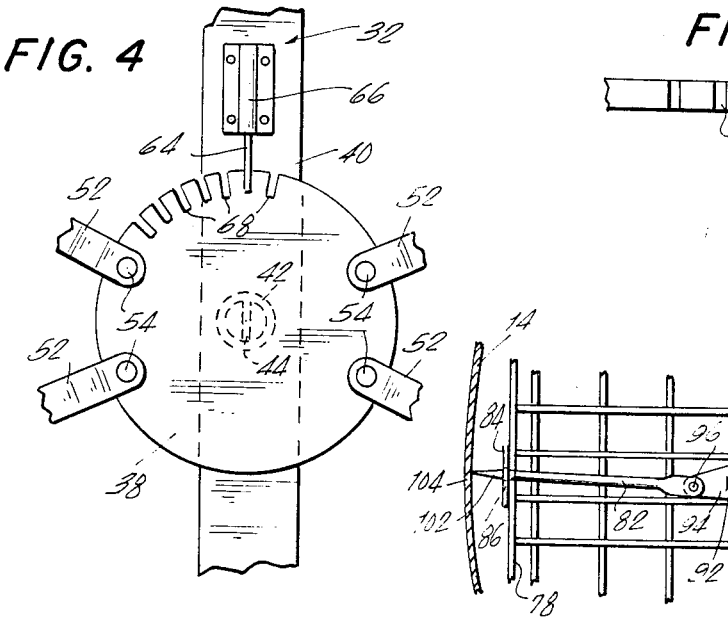
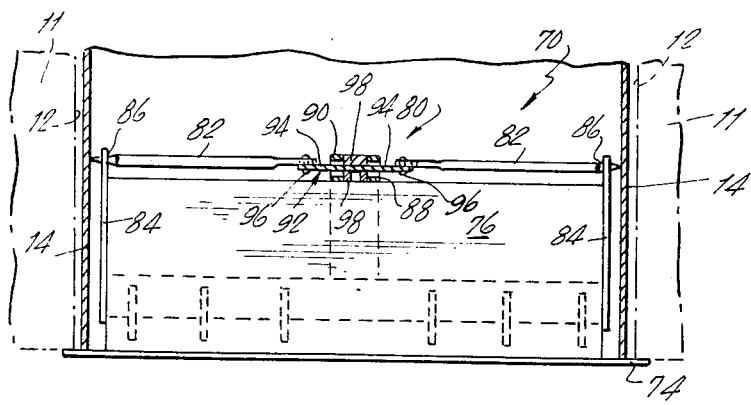
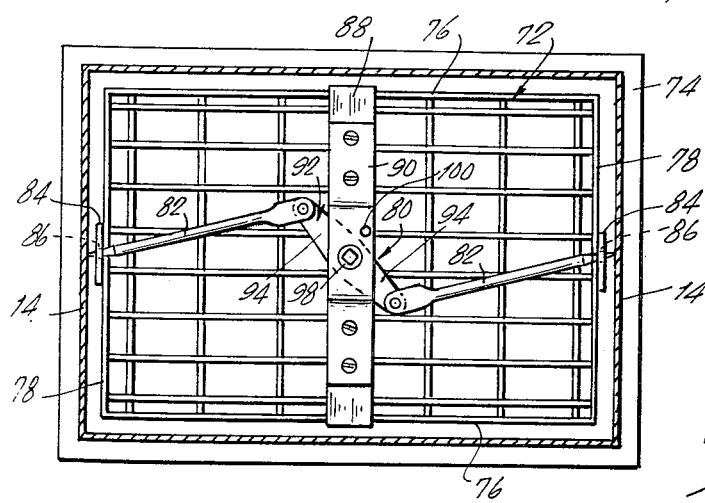

United States Patent Office 3,504,618
Patented Apr. 7, 1970

3,504,618
AIR DUCT REGISTER WITH ANCHORING
DEVICE
Irving Rosner, 103 Remsen Ave.,
Brooklyn, N.Y. 11212
Filed Mar. 11, 1968, Ser. No. 712,228
Int. Cl. F24f 13/08
U.S. Cl. 98—108                                         2 Claims

ABSTRACT OF THE DISCLOSURE

An air duct register, diffuser, or the like having an improved retaining or anchoring device which secures the register to the end of a duct and/or to a wall at an opening therein. Such anchoring means includes a plurality of reciprocable detent members such as rods which are selectively simultaneously advanced in generally radially outward directions to engage the end of the air duct and/or opening in the wall, whereby securely to mount the register, and are simultaneosuly retracted to release the register.

BACKGROUND OF THE INVENTION

Field of the invention

The invention relates to an air duct register having a novel device for securing it to an air duct and/or the opening in a wall through which the duct extends.

Description of the prior art

Present registers or diffusers are mounted on the ends of air ducts or at the opening in a wall to which the duct extends by screw or bolt means. This requires the cutting or telescoping of collars, and the drilling of holes in the collars or walls in order to secure the register in place. Such operation is difficult when the wall is made of hand material such as poured concrete, and is particularly difficult when no electric current source is available for electric drills.

Registers or diffusers provided with anchoring devices in accordance with the invention may be quickly installed by hand with the use of a simple tool, and when installed are securely retained in place. No drilling of the duct, collar, or wall is required. The register may be quickly removed, likewise by use of such tool. If desired, such tool may be made as a permanent part of each register.

SUMMARY OF THE INVENTION

The anchoring means of the invention is shown employed on a register for an air duct extending to an opening in a wall. The register has duct means on its rear end which telescopes within the duct and/or an opening in a wall to which the duct extends. A plurality of detents in the form of generally radially disposed rods reciprocate generally in a plane tranverse to the axis of the duct or wall opening, the outer ends of the rods being disposed forcibly to engage the inner wall of the duct to retain the register thereon. The outer ends of the rods may be sharpened, so that upon the installation of the register in a duct such ends of the rods form detent retaining seats in the duct. In the first disclosed embodiment, the pointed ends of the rods pierce the walls of the duct. The anchoring means may be so made that the outer ends of the rods form detent retaining depressions in the surface of the wall opening, or may resiliently bend the walls of the duct outwardly, as in the second disclosed embodiment.

Means is provided for simultaneously advancing the rods outwardly, when the registerd is being installed, and for retracting them when the register is being removed. In the embodiment shown, the detent actuating means is a multiple-armed centrally located crank to the arms of which the inner ends of the rods are pivotally connected. The crank may be turned by an outwardly disposed crank arm to reciprocate the detents. Such crank may be either in the form of a removable tool, or may be a permanent part of the register.

BRIEF DESCRIPTION OF THE DRAWING

The above and further objects and novel features of the invention will more fully appear from the following description in connection with the accompanying drawings. It is to be expressly understood, however, that the drawings are for the purpose of illustration only, and are not intended as a definition of the limits of the invention.

In the drawings, wherein like reference characters refer to like parts throughout the several views.

FIG. 4 is a frgmentary view in end elevation on an enlarged scale of the central portion of the register anchoring means positioned as in FIG. 3;

FIG. 5 is a fragmentary view in plan of the crank-forming disc of the anchoring means;

FIG. 6 is a view in central transverse section through a register incorporating a second embodiment of anchoring mechanism in accordance with the invention, certain of the parts being shown in elevation;

FIG. 7 is a view in end elevation of the register of FIG. 6, the view being taken from the rear or upper end of the register as shown in FIG. 6, the register anchoring means being shown in its retracted, inoperative position, and FIG. 8 is a fragmentary view in end elevation, taken similarly to the view of FIG. 7, but with the register anchoring means extended into operative position resiliently to bow the walls of the duct outwardly.

DESCRIPTION OF THE PREFERRED EMBODIMENTS

Figures 1, 2, 3:
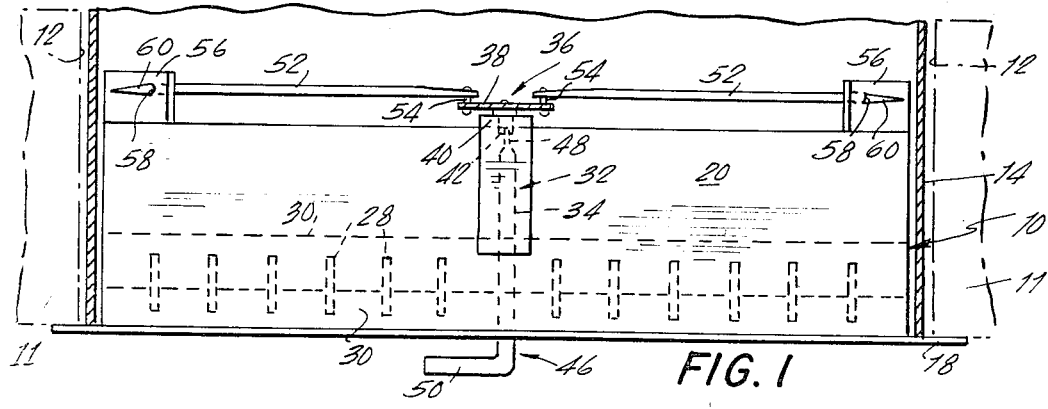
FIG. 1 is a view in transverse section through a register or diffuser incorporating a first embodiment of anchoring mechanism in accordance with the invention, the section being taken generally along the line 1—1 of FIG. 2, certain of the parts being shown in elevation.
FIG. 2 is a view in end elevation of the register of FIG. 1, the view being taken from the rear or upper end of the register as shown in FIG. 1, the register anchoring means being shown in its retracted, inoperative position.
FIG. 3 is a view similar to FIG. 2 but with the register anchoring means in its extended, operative position.

As is apparent from the above, two embodiments of register anchoring mechanisms are illustrated and described herein. The first such mechanism, which is shown in FIGS. 1–5, inclusive, employs pointed rod-like detents which when initially advanced into their outer operative positions pierce the walls of the duct thereby forming recesses or seats for the ends of the detents. In the second embodiment of the mechanism of the invention, illustrated in FIGS. 6, 7, and 8, the parts are so constructed and arranged that the outer ends of the rod-like detents engage and at most indent portions of the walls of the duct which may be resiliently bowed outwardly. The register in this embodiment is retained fixed with respect to the duct by reason of predominantly frictional engagement between the walls of the ducts and the outer ends of the detents.

Turning now to FIGS. 1–5, inclusive, of the drawing, the register there shown is designated generally by the reference character 10. Register 10 is shown secured to an air duct 14 which extends outwardly through an opening 12 in a wall 11. In order to mask such opening and to position the outer end of the register flush with the wall, the register is provided with a marginal wall abutting flange or escutcheon plate 18. The register 10 has an open frame or body 20 which in this instance is rectangular in shape and has two spaced parallel side frame members 22 joined by two spaced parallel end frame members 24. A grille designated 26 is secured within the frame so as to span the forward passage therethrough. Grille 26 has a plurality of spaced parallel vertical members 28 and a plurality of spaced horizontal members 30. The outer end of duct 14, which may be a so-called clinch collar connected to a main conduit (not shown), telescopically receives the rear end register of the body 20 of the register therewithin. This much of the construction shown is old; the present invention is concerned with a novel, improved mechanism for securing the register 10 to the duct 14 and/or the opening through the wall so that the register may be quickly and securely installed, and may be as quickly removed from the duct when necessary.

A broad U-shaped bar or strap member 32 having a broad bight portion 40 is secured centrally of body 20, with the portion 40 overlying the rear or upper end of the body and the legs of member 32 lying outwardly of and secured to the frame members 22. A central horizontal bore 34 is provided in bight portion 40 so as to journal the hub of a retainer mechanism operating disc member 38 which forms a part of the actuating means 36 for the anchoring mechanism. The disc 38, which lies upwardly or rearwardly of portion 40 of member 32, has a hub in the form of a central stub shaft 42 which is journalled in the bore 34 in portion 40 of member 32. The forward end of stub shaft 42, in the portion thereof lying within the bore 34, is provided with a diametrical slot 42 which is open to the front of the register. A removable tool 46, for operating the register anchoring mechanism, has a shank or stem which is receivable within the bore 34, there being a blade 48 on the forward end of the stem which is receivable within the slot 44. The outer end of the stem of the tool is proivded with a handle 50 whereby the tool when inserted into the register from the front, as shown in FIGS. 1, 2, and 3, may be turned to turn the disc 38 from the detent-retracted, inoperative position of FIGS. 1 and 2 to the detent-extended, operative position of FIG. 3. In the embodiment shown, the tool 46 is removable from the register. If desired, however, the tool may be permanently secured to the disc 38 and form a permanent part of the operating mechanism for the anchoring means therefor.

In the illustrative embodiment there are shown four rod-like detents 52 which are disposed generally radially of the disc 38 and coplanar thereof and extend outwardly generally into the corners of the rectangular duct 14. The inner end of each of members 52 is connected to the disc 38 adjacent the rim thereof by a pivot pin 54. It will be obvious that the disc 38 functions as a multi-armed crank which selectively advances and retracts the members 52 as it is turned in opposite directions.

The outer ends of the members 52 are loosely received within holes 58 through members 56 which are disposed across the corners of the frame and upwardly or rearwardly thereof, as shown. The outer ends of the members 52 are pointed and, as noted, engage the walls of the duct 14 adjacent the corners thereof. Such walls are relatively unyielding at the corners of the duct, and thus upon the initial installation of the register in the duct and the advance of the members 52 outwardly from their retracted positions (FIG. 2) into that of FIG. 3 the pointed ends 60 of the rods 52 puncture holes 62 in the walls of the duct. The register is thereby held securely in place until the retaining means is retracted by turning disc 38 in the reverse direction. When the register is to be re-applied to the duct 14, the outer ends of the rods 52 may again be disposed within the previously formed holes 62 in the duct.

It is to be understood that, if desired, the detents 52 may be extended only sufficiently either frictionally to engage the walls of duct 14 or to indent them without piercing them. It is also to be understood that in some instances, wherein the duct 14 fits snugly within the opening 12 in the wall 11, the points 60 of the rod-like detents 52 may extend into the wall when the detents are fully extended, thereby additionally securing the register to the wall.

In order to retain the register anchoring mechanism stably in both its retracted and its fully or partially advanced positions, there is provided a leaf spring or finger 64 which is mounted in a bracket 66 affixed to the portion 40 of the U-shaped member 32. The outer free end of the finger 64 is selectively received within one of a plurality of radially extending slots 68 in the edge of the disc 38. Slots 68 may conveniently be formed either by a sawing or milling operation.

The register shown in FIGS. 6, 7, and 8, which is generally designated by the reference character 70, cooperates with an air duct 14 extending through a wall 11 in generally the same manner as that above described. Register 70 has an open frame 72 with a marginal flange 74, the register being telescoped within the outer end of the duct 14. The register in this case is square in cross section having side frame members 76 and end frame members 78 of generally the same length.

The detent or rod-operating means, which is generally designated 80, simultaneously advances or retracts two similar oppositely disposed rods 82 so as to secure the register to the duct and to free it therefrom, respectively. The rods 82 are loosely guided at their outer ends in holes 86 through portions of rod guide 84 which extend upwardly or rearwardly beyond the body or frame 72 of the register; the rod guides are in the form of strap members which are secured to the central portions of the frame members 78 outwardly thereof. Centrally of the frame 72 there is disposed a member 88 of generally U shape, the parallel legs of members 88 being telescoped over the side frame members 76 and secured thereto. Overlying the central portion of member 88 there is a short member 90 which is bent into a shallow U-shape with a broad flat bight portion.

In the space provided between the confronting faces of members 88 and 90, there is mounted a double-armed crank 92, the crank arms 94 of which extend in opposite directions. The inner ends of the detents or rods 82 are connected to the outer ends of the crank arms 94 by pivot pins 96. The crank 92 is provided with hubs 98 which project in opposite directions therefrom, such hubs being journalled in bores in the respective members 88 and 90. The forward hub 98 is provided with a formation such as a slot or a non-circular recess which receives the rear end of an operating tool similar to the tool 46 which is employed with the above described first embodiment of register anchoring mechanism.

Upon turning the crank 92 counterclockwise (FIG. 7) into the position of FIG. 8, the rod-like detents 82 are advanced outwardly so that the ends 102 thereof engage the inner wall of the duct 14. Such ends 102 are preferably sharpened as shown, so that frictional engagement between them and the duct is increased. The ends 102 of the members 82 engage the walls of the duct substantially centrally of opposite sides thereof, in zones wherein the walls are readily resiliently deformable. As a result, when the members 82 are advanced into the position of FIG. 8, such walls are bulged outwardly as shown at 104 rather than being pierced by the sharpened ends of the members 82.

In order stably to retain the crank 92 and the rods 82 in the positions thereof shown in FIG. 8, there is provided a stop pin 100 which is screwed into member 90 and extends into the space between such member and member 88, the pin 100 being so located that it serves to stop the counterclockwise rotation of crank 92 shortly after the crank has passed through its dead center position, that is, the position in which the arms of the crank are aligned with the respective members 82. The anchoring mechanism is thereby retained in its advanced, operative position, since the outwardly bowed walls of the duct, acting through the members 82, constantly maintain the crank 92 in forcible engagement with the stop pin 100. The register 70 may be readily removed from duct 14 by turning the crank 92 in a clockwise (FIGS. 7 and 8) direction to restore it to the position of FIG. 7. The resiliency of the walls of the duct cause them to return substantially to their initial position, shown in FIG. 7.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What I claim is:

1. A terminal fitting anchoring means for an air duct, which comprises a plurality of generally radially reciprocable rod-like detents spaced around a hollow fluid-conducting body at the rear thereof, said detents being positioned so that their outer ends engage the duct rearwardly of its forward, outer end when they are outwardly extended, and disc means on which the inner ends of the rod-like detents are mounted operable from the front of the fitting for selectively simultaneously outwardly extending the detents to secure the fitting to the duct and for simultaneously retracting them inwardly so that the conduit portion on the fitting may be freely inserted into and removed from the outer end of the duct, wherein the disc means is provided with a series of radial peripheral slots, and a finger affixed to the body of the fitting and selectively received in successive slots in the disc as the disc is rotated.

2. A terminal fitting according to claim 1 wherein the radial peripheral slots extend around only a portion of the periphery of the disc.

References Cited

UNITED STATES PATENTS

| | | | |
|---|---|---|---|
| 682,117 | 9/1901 | Sayre | 292—7 |
| 3,366,031 | 1/1968 | Hedrick | 98—101 |

MEYER PERLIN, Primary Examiner

U.S. Cl. X.R.

292—7